(12) United States Patent
Plano Morillo et al.

(10) Patent No.: US 10,451,034 B2
(45) Date of Patent: Oct. 22, 2019

(54) METHODS AND SYSTEMS FOR ALLEVIATING LOADS IN OFF-SHORE WIND TURBINES

(71) Applicant: GAMESA INNOVATION & TECHNOLOGY, S.L.

(72) Inventors: Eugenio Plano Morillo, Zamudio (ES); Ignacio Fernandez Romero, Sarriguren (ES)

(73) Assignee: SIEMENS GAMESA RENEWABLE ENERGY INNOVATION & TECHNOLOGY, S.L., Sarriguren (Navarra) (ES)

( * ) Notice: Subject to any disclaimer, the term of this patent is extended or adjusted under 35 U.S.C. 154(b) by 613 days.

(21) Appl. No.: 13/787,882

(22) Filed: Mar. 7, 2013

(65) Prior Publication Data

US 2014/0255185 A1 Sep. 11, 2014

(30) Foreign Application Priority Data

Mar. 8, 2012 (ES) .................................. 201200239

(51) Int. Cl.
 *F03D 7/04* (2006.01)
 *F03D 7/02* (2006.01)

(52) U.S. Cl.
 CPC ........... *F03D 7/0224* (2013.01); *F03D 7/042* (2013.01); *F03D 7/046* (2013.01); *F03D 7/048* (2013.01); *F05B 2240/95* (2013.01); *F05B 2240/96* (2013.01); *F05B 2270/1095* (2013.01); *Y02E 10/723* (2013.01)

(58) Field of Classification Search
 CPC ........ F03D 7/0224; F03D 7/042; F03D 7/046; F03D 7/048; F05B 2240/95; F05B 2240/96; F05B 2270/1095; Y02E 10/723
 USPC .......................................................... 700/287
 See application file for complete search history.

(56) References Cited

U.S. PATENT DOCUMENTS

| 2006/0002792 | A1  | 1/2006 | Moroz et al. | |
|---|---|---|---|---|
| 2007/0041837 | A1* | 2/2007 | Ide ......................... | F03D 7/0224 416/147 |
| 2008/0078228 | A1* | 4/2008 | Nies ..................... | F03D 11/0091 73/1.01 |
| 2010/0133815 | A1  | 6/2010 | Middendorf et al. | |
| 2011/0074155 | A1  | 3/2011 | Scholte-Wassink | |
| 2011/0098975 | A1* | 4/2011 | Mazzaro .................. | G01D 3/08 702/183 |

(Continued)

*Primary Examiner* — Bryan M Lettman
*Assistant Examiner* — Charles W Nichols
(74) *Attorney, Agent, or Firm* — Ladas & Parry LLP

(57) ABSTRACT

Control methods and systems of a wind turbine belonging to an off-shore wind park that use, in case of malfunction of the load measuring system, one of the following pitch vectors for the calculation of the individual pitch command of each blade:
 the pitch vector being applied at the same time in one wind turbine of the wind park where the load measuring system works properly
 a mean value of the pitch vectors being applied at the same time in a group of wind turbines of the wind park where the load measuring system works properly;
 the pitch vector resulting from a control law, obtained from historic records of the wind turbine when the load measuring system worked properly, defining the pitch vector as a function of at least the wind speed V, if the former pitch vectors are not available.

15 Claims, 2 Drawing Sheets

(56) References Cited

U.S. PATENT DOCUMENTS

| | | | |
|---|---|---|---|
| 2011/0115224 A1* | 5/2011 | Lausen | F03D 7/0204 290/44 |
| 2011/0213590 A1 | 9/2011 | Middendorf et al. | |
| 2012/0051907 A1* | 3/2012 | Rogers | F03D 7/0224 416/1 |

* cited by examiner

METHODS AND SYSTEMS FOR ALLEVIATING LOADS IN OFF-SHORE WIND TURBINES

FIELD OF THE INVENTION

The invention relates to methods and systems for alleviating the loads generated by wind asymmetries in wind turbines and, more in particular, in off-shore wind turbines.

BACKGROUND

As a wind turbine blade sweeps around the 'rotor disc', it experiences changes in wind speed and direction as a result of wind shear, tower shadow, yaw misalignment and turbulence. As rotor sizes increases with respect to the typical sizes of turbulent eddies, the importance of turbulent wind speed variations across the rotor disc becomes greater.

These variations result in a large once-per-revolution, or 1P, components in the blade loads, together with harmonics of this frequency, i.e. 2P, 3P, 4P and so on. With a three-bladed rotor, these load components will be 120° out of phase between the three blades, with the result that the hub and the rest of the structure will experience the harmonics at 3P, 6P, etc., but the 1P components and the other harmonics will tend to cancel out.

However, this cancellation relies on assumptions of stationary and linearity, but as wind turbines become larger with respect to the length scales of the turbulence, these assumptions become less valid.

This means that the asymmetric loads resulting from 1P components and other harmonics no longer cancel out, and load components at these frequencies can contribute very significantly to fatigue loads on the hub, shafts, yaw bearing, tower, etc.

For reducing said damaging effects, the prior art teaches the use of an individual pitch control added to the collective pitch control and also yaw control. The pitch and/or yaw commands for reducing said asymmetric loads are calculated using measurements of said loads or of the displacements caused by them.

The 1P load components are particularly significant on large wind turbines and, in principle, it should be possible to reduce these by means of individual blade pitch action at the 1P frequency, 120° out of phase at the three blades. This individual pitch action at 1P frequency may be calculated by a control algorithm that uses, as input, the blade out-of-plane loads.

An example of this technique can be found in US 2006/0002792, which is incorporated by reference, where a method to reduce the loads and to provide yaw alignment in a wind turbine that includes the measurement of displacements or moments of the asymmetric loads in a wind turbine is described. Those measured moments or displacements are used to determinate the pitch angle contribution that will try to reduce or counteract the asymmetric rotor loads and to an easy alignment of the yaw system.

If the measuring devices of said displacements or moments fail, and consequently said individual pitch action cannot be implemented, the prior art teaches the operation of the wind turbine at a lower production level for reducing the asymmetric rotor loading until the failure is repaired.

In the case of off-shore wind turbines, the repair of the measuring devices may be delayed long periods of time involving important production losses.

SUMMARY OF THE INVENTION

It is an object of this invention to provide control methods and systems for improving the power production of off-shore wind turbines having an individual pitch control system for counteracting rotor asymmetric loads when the load measuring system used by said individual pitch control system fails.

It is another object of the present invention to provide control methods and systems for alleviating loads of off-shore wind turbines having an individual pitch control system for counteracting rotor asymmetric when the load measuring system used by said individual pitch control system fails.

In one aspect, these and another objects are met by a control method comprising the step of using, in case of malfunction of the load measuring system, the following pitch vector for the calculation of the individual pitch command of each blade:

the pitch vector being applied at the same time in one wind turbine of the wind park where the load measuring system works properly (preferably the closest wind turbine) or a mean value of the pitch vectors being applied at the same time in a group of wind turbines of the wind park where the load measuring system works properly;

the pitch vector resulting from a control law, obtained from historic records of the wind turbine when the load measuring system worked properly, defining the pitch vector as a function of at least the wind speed V, if the former pitch vectors are not available.

In another aspect the above mentioned objects are met by a control system being arranged for performing a regulation of the wind turbine according to a predetermined power curve for wind speeds below the cut-out wind speed $V_{out}$ including an individual pitch regulation of each blade based on a load measuring system, wherein the control system is also arranged for performing an alternative regulation in case of malfunction of said load measuring system according to an alternative power curve, reducing the power production with respect to the predetermined power curve, and including an alternative individual pitch control for counteracting rotor asymmetric loads using the following pitch vector for the calculation of the individual pitch command of each blade:

the pitch vector being applied at the same time in at least one wind turbine of the wind park where the load measuring system works properly or a mean value of the pitch vectors being applied at the same time in a group of wind turbines of the wind park where the load measuring system works properly;

the pitch vector resulting from a control law, obtained from historic records of the wind turbine when the load measuring system worked properly, defining the pitch vector as a function of at least the wind speed, if the former pitch vectors are not available.

The pitch vector to be applied in a wind turbine when its load measurement system fails can be obtained from the wind park controller in the three cases mentioned or from another wind turbine (if they are provided with communication means) or can be obtained in the own wind turbine (in the case of pitch vector resulting from a control law).

Other desirable features and advantages of said methods and systems of off-shore wind turbines will become apparent from the subsequent detailed description of the invention and the appended claims, in relation with the enclosed drawings.

DETAILED DESCRIPTION OF THE INVENTION

Figure 1:
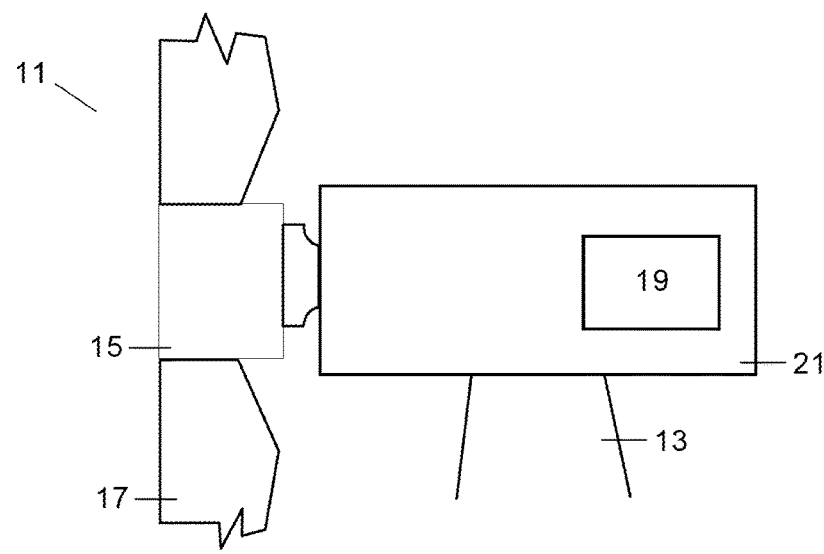
FIG. 1 is a schematic section side view of a wind turbine.

A typical off-shore wind turbine 11 of a wind park comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The wind turbine power output is typically controlled by means of a control system for regulating the pitch angle of the rotor blades and the generator torque. The rotor rotational speed and power output of the wind turbine can hereby be initially controlled.

Figure 2:
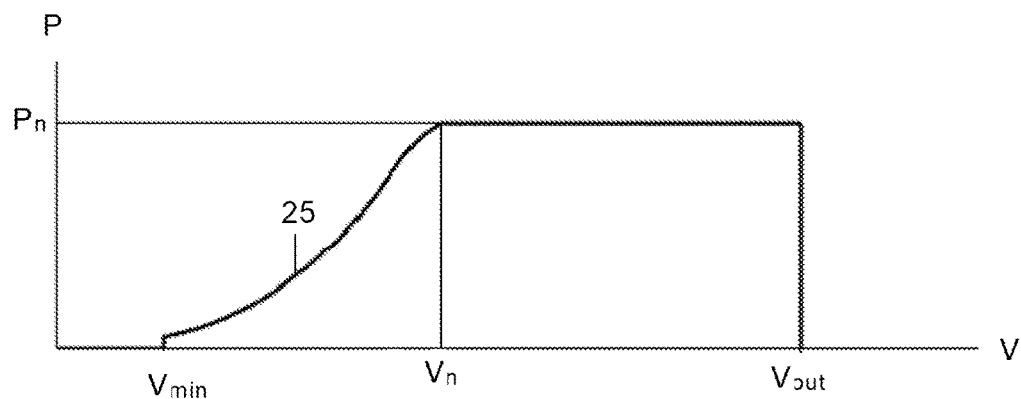
FIG. 2 shows a typical power curve of a wind turbine.

Below the cut-out wind speed $V_{out}$ the wind turbine control system is arranged to regulate the power production according to a curve which defines the desired functional relationship between power and speed to achieve ideal output. A curve of this type is curve 25 in FIG. 2 showing that the power production P increases from a minimum wind speed $V_{min}$ to the nominal wind speed $V_n$ and then remain constant in the nominal power value $P_n$ up to the cut-out wind speed $V_{out}$ where decreases up to 0.

For implementing said regulation a control unit receives input data such as wind speed V, generator speed Ω, pitch angle θ, power P from well-known measuring devices and send output data to, respectively, the pitch actuator system for changing the angular position of the blades 17 and to a generator command unit for changing the reference for the power production.

The control system is also arranged for applying an individual pitch command to each blade for reducing the asymmetric loads that is calculated using the data provided by a load measuring system. This individual pitch is superimposed to the collective pitch used for regulating the power production according to the power curve 25 of FIG. 2.

Figure 3:
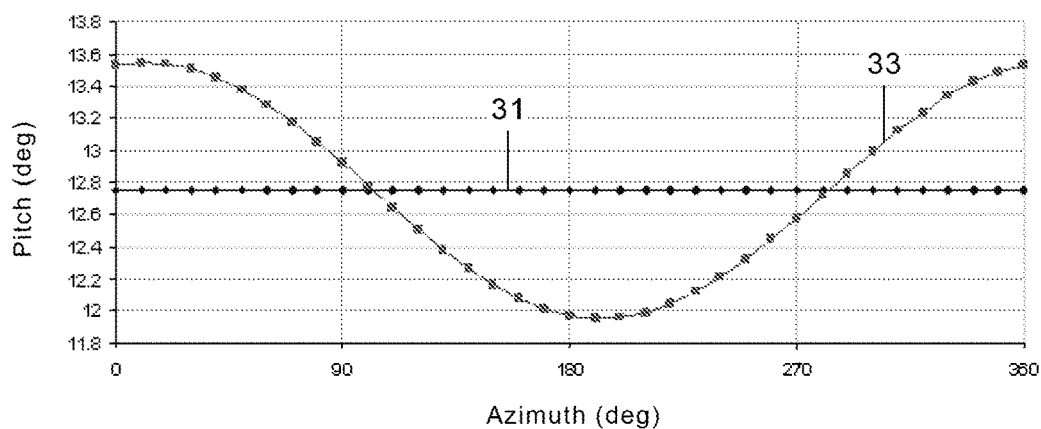
FIG. 3 is a diagram showing the pitch command of the collective pitch regulation and the pitch command resulting of adding a cyclic regulation in a revolution of a wind turbine blade.

In FIG. 3, the line 31 represents the collective pitch command applied to all the blades, i.e. a constant pitch along one blade revolution, and the line 33 represents the pitch command applied to one blade along a blade revolution resulting of adding an individual pitch command to the collective pitch command.

The individual pitch command to be provided to each blade is generated as follows:

Three blades out-of-plane bending moment signals $B_1$, $B_2$, $B_3$ (derived from the flapwise and edgewise signals that comes from the load measuring system) are transformed into two orthogonal My and Mz moments using the Park's transformation.

A controller for each axis generates the pitch contributions Z-Pitch and Y-Pitch for reducing or counteracting the asymmetrical rotor loads.

A pitch vector, defined by a module M and an argument A, is calculated using the equations $M=(Z\text{-Pitch}^2+Y\text{-Pitch}^2)^{1/2}$, $A=a\tan(Z\text{-Pitch}/Y\text{-Pitch})$.

The pitch vector is used by the control system to calculate the individual pitch command to be applied to each blade, by, firstly, a conversion into two orthogonal pitch angle references using the equations $Z\text{-Pitch}=M\sin(A)$, $Y\text{-Pitch}=M\cos(A)$ and, then, generating the individual pitch commands using the inverse of the Park's transformation and the rotor azimuth angle.

When the load measuring system of a wind turbine fails and consequently an individual pitch command for each blade cannot be generated, the invention propose using the following pitch vector for obtaining the individual pitch commands to be applied to each blade:

in the first place, the pitch vector being applied at the same time in one wind turbine of the wind park where the load measuring system of the rotor loads work properly or a mean value of the pitch vector being applied at the same time in a group of wind turbines of the wind park where the load measuring system works properly;

in the second place (if none of the former pitch vectors is available), the pitch vector resulting of a control law defining the pitch vector as a function of least the wind speed based on historic records of the wind turbine when the load measuring system worked properly.

The greater stability of the environmental conditions in an off-shore wind park than in an on-shore wind park allows the use of said alternative pitch vectors for avoiding power production losses when the load measuring system of the wind turbine is damaged. In any case, when any of said alternative pitch vectors is used, the regulation of the wind turbine shall be done following a sub-optimum power production curve for avoiding risks.

Figure 4:
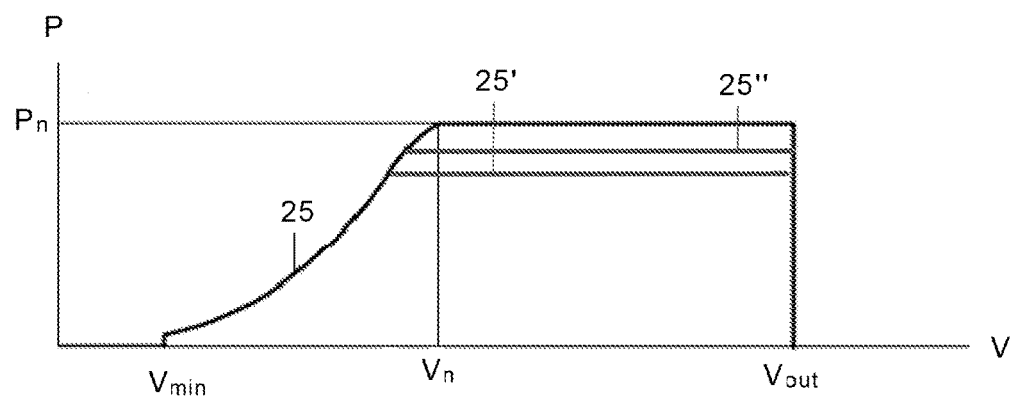
FIG. 4 show the power curves to be used in the regulation of the wind turbine in the three states considered in this invention.

FIG. 4 show the power curves 25, 25', 25" to be used, respectively, in a normal state of the wind turbine, in a state without individual pitch control due to the malfunction of the load measuring system, and in a state with an alternative individual pitch control according to the present invention.

In the above-mentioned first alternative, the preferred options are the pitch vector being used in the closest wind turbine and the mean of the pitch vectors being used in the wind park. In the first case, the wind turbine may receive the pitch vector directly from the closest wind turbine if they have communication means or from the wind park controller otherwise. In the second case, the wind turbine receives the pitch vector from the wind park controller.

In the above-mentioned second alternative, which is chosen when the first alternative cannot be implemented due to, for example, communication problems with the wind park controller, a control law, obtained from historical data in the own wind turbine when the load measuring system worked properly and stored in the storing means of the wind turbine control system, is used.

Figure 5A:
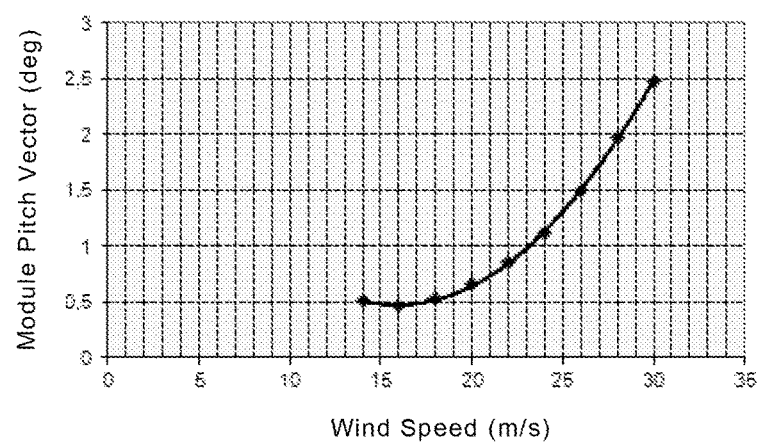
FIGS. 5a and 5b shows a control law of an individual pitch control according to the present invention.
Figure 5B:
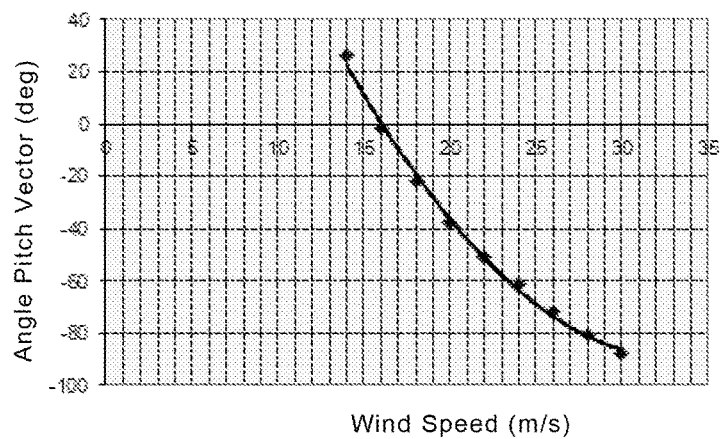

Said control law may a single-variable law as the control law shown in FIGS. 5a and 5b where the module M and the angle A of the pitch vector to be used depends only of the wind speed V or a multi-variable law, for example a control law where the module M and the angle A of the pitch vector depends on the wind speed, on the wind direction, on the yaw position, on the wind shear and on the year period, i.e. the law will comprise different curves for the different working scenarios.

The curves of FIGS. 5a and 5b are second order polynomial equations obtained from a set of data obtained in a simulation of the behaviour of an off-shore wind turbine with a correlation factor close to 1 so that it can be assumed that the pitch vector used by the control system of the wind turbine when the load measuring system worked properly may be represented by the above-mentioned control laws.

The implementation of the alternative individual pitch control according to this invention is done upon the typical wind turbine controller including the individual pitch contribution after the collective pitch command is determined by the controller. The collective pitch is still the standard pitch reference for the controller regarding alarms and operation set points.

The main advantages of the individual pitch control according to the present invention are the following:

- It can be easily implemented in those off-shore wind turbines already in operation with individual pitch actuation systems
- It can improve the power production of off-shore wind turbines in about a 10% when their load measuring systems are damaged.

Although the present invention has been described in connection with various embodiments, it will be appreciated from the specification that various combinations of elements, variations or improvements therein may be made, and are within the scope of the invention.

The invention claimed is:

1. A control method for a wind turbine belonging to an off-shore wind park, comprising the steps of:
    providing said wind turbine with a rotor having a plurality of blades, a load measuring system that provides pitch data from the plurality of blades that is used to calculate if there are asymmetric loads on the rotor, and a control system for receiving the pitch data from the load measuring system and for calculating and applying an individual pitch command to each blade for counteracting the rotor asymmetric loads based on the pitch data from the load measuring system,
    using the control system to determine whether the load measuring system of the wind turbine is malfunctioning and, if so, to alleviate asymmetric loads using a pitch vector for calculating the individual pitch command for each blade of the wind turbine by:
    applying a pitch vector calculated by one wind turbine of the wind park where a load measuring system of the one wind turbine works properly, the pitch vector being applied at the same time in the one wind turbine of the wind park where the load measuring system of the one wind turbine works properly, or applying a mean value of pitch vectors calculated based on data from a group of wind turbines of the wind park where load measuring systems of the group of wind turbines work properly, wherein the mean value of the pitch vectors is a mean of the pitch vectors applied at the same time in the group of the wind turbines where the load measuring systems of the group of wind turbines work properly; and
    if pitch vectors used by one or more wind turbines of the wind park are not available, applying a pitch vector obtained from a control law that uses historical records of the wind turbine when the load measuring system of the wind turbine worked properly, and that defines the pitch vector as a function of at least wind speed V.

2. The control method for a wind turbine according to claim 1, wherein the pitch vector used to control the wind turbine is a pitch vector being used to control a closest wind turbine.

3. The control method for a wind turbine according to claim 1, wherein said control law is a function of at least the wind speed and at least one of the following variables: wind direction, wind shear, yaw position, and/or year period.

4. The control method according to claim 1, wherein the wind park has a controller that enables communication between the wind turbine and other wind turbines in the wind park, and wherein, the pitch vector obtained from the control law that uses historical records of the wind turbine is applied when there are communication problems with the wind park controller.

5. A system for alleviating loads in a wind turbine belonging to an off-shore wind park, wherein the system comprises:
    (a) a rotor with a plurality of blades,
    (b) measuring devices for measuring at least one of wind speed V, wind direction, pitch angle θ of each blade of the wind turbine, and azimuth position ψ of each blade of the wind turbine,
    (c) a load measuring system that provides pitch data from the measuring devices that is used to calculate if there are asymmetric loads on the rotor; and
    (d) a control system connected to the load measuring system and to the measuring devices;
    wherein the control system is connected to individual pitch control actuators for each blade of the wind turbine and a torque control actuator;
    wherein the control system comprises communication means for communicating with a wind park controller;
    wherein the control system is configured to receive the pitch data from the load measuring system and to perform a regulation of the wind turbine according to a predetermined power curve for wind speeds below a cut-out wind speed $V_{out}$ including an individual pitch regulation for each blade of the wind turbine based on the pitch data received from said load measuring system;
    wherein the control system is configured to perform an alternative regulation in case of malfunction of said load measuring system according to an alternative power curve, which reduces the power production with respect to the predetermined power curve, and which includes an alternative individual pitch control for counteracting rotor asymmetric loads using a pitch vector for calculating an individual pitch command for each blade of the wind turbine;
    wherein the pitch vector being applied is a pitch vector calculated by at least one wind turbine of the wind park where a load measuring system of the at least one wind turbine works properly, the pitch vector being applied at the same time in the one wind turbine of the wind park where the load measuring system of the at least one wind turbine works properly, or is a mean value of pitch vectors calculated based on data from a group of wind turbines of the wind park where load measuring systems of the group of wind turbines work properly, wherein the mean value is a mean of the pitch vectors applied at the same time in the group of the wind turbines where the load measuring systems of the group of wind turbines work properly; and if pitch vectors calculated by one or more wind turbines of the wind park are not available,
    wherein the pitch vector being applied is obtained from a control law that uses historical records of the wind turbine when the load measuring system of the wind turbine worked properly, and that defines the pitch vector as a function of at least wind speed V.

6. The system according to claim 5, wherein the pitch vector used to control the wind turbine is a pitch vector being used to control a closest wind turbine.

7. The system according to claim 5, wherein the pitch vector used to control the wind turbine is a mean value of pitch vectors being used to control a group of wind turbines of the wind park at a same time.

8. The system according to claim 5, further comprising a direct communication means for all wind turbines in the wind park, wherein the pitch vector used to control the wind turbine is a pitch vector being used to control a closest wind turbine.

9. The system according to claim 5, wherein said control law is stored at the wind park controller.

10. The system according to claim 5, wherein said control law is stored in a storing means of the control system.

11. The system according to claim 9, wherein said control law is a function of the wind speed V and one or more of wind direction, wind shear, yaw position, and year period.

12. An off-shore wind turbine comprising the system of claim 5.

13. The system according to claim 5, wherein the wind park has a controller that enables communication between the wind turbine and other wind turbines in the wind park, and wherein, the pitch vector obtained from the control law that uses historical records of the wind turbine is applied when there are communication problems with the wind park controller.

14. A system for alleviating loads in a wind turbine belonging to an off-shore wind park, comprising:
   a first wind turbine;
   a second wind turbine; and
   a wind park controller;
   wherein the first wind turbine comprises:
   (a) a rotor with a plurality of blades,
   (b) measuring devices for measuring at least one of wind speed V, wind direction, pitch angle $\theta$ of each blade of the wind turbine, and azimuth position $\psi$ of each blade of the wind turbine,
   (c) a load measuring system that provides data from the measuring devices that is used to calculate if there are asymmetric loads on the rotor; and
   (d) a control system connected to the load measuring system and to the measuring devices;
   wherein the control system is configured to perform the following operations:
   (1) determining whether the load measuring system is malfunctioning;
   (2) applying to the first wind turbine pitch vectors received directly from the second wind turbine having an operable load measuring system, wherein the pitch vectors are being applied by the second wind turbine at the same time;
   (3) causing the first wind turbine to use the pitch vectors received from the second wind turbine to calculate individual pitch commands for rotor azimuth angles of each blade of the first wind turbine;
   (4) applying to the first wind turbine collective pitch commands for all the blades of the first wind turbine received from the second wind turbine or the wind park controller;
   (5) applying the collective pitch commands to all the blades of the first wind turbine;
   (6) superimposing the individual pitch commands for rotor azimuth angles of each blade of the first wind turbine to the collective pitch commands to reduce asymmetric loads on the rotor of the first wind turbine without using the load measuring system of the first wind turbine; and
   (7) if pitch vectors the second wind turbine are not available, applying a pitch vector obtained from a control law that uses historical records of the first wind turbine when the load measuring system of the first wind turbine worked properly, and that defines the pitch vector as a function of at least wind speed V.

15. The system according to claim 14, wherein the wind park has a controller that enables communication between the wind turbine and other wind turbines in the wind park, and wherein, the pitch vector obtained from the control law that uses historical records of the wind turbine is applied when there are communication problems with the wind park controller.

* * * * *